(12) United States Patent
Majumder et al.

(10) Patent No.: US 9,052,584 B2
(45) Date of Patent: Jun. 9, 2015

(54) COLOR SEAMLESSNESS ACROSS TILED MULTI-PROJECTOR DISPLAYS

(75) Inventors: Aditi Majumder, Irvine, CA (US); Gopi Meenakshisundaram, Irvine, CA (US); Behzad Sajadi, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 115 days.

(21) Appl. No.: 13/318,104

(22) PCT Filed: Apr. 28, 2010

(86) PCT No.: PCT/US2010/032831
§ 371 (c)(1),
(2), (4) Date: Nov. 29, 2011

(87) PCT Pub. No.: WO2010/129361
PCT Pub. Date: Nov. 11, 2010

(65) Prior Publication Data
US 2012/0069022 A1     Mar. 22, 2012

Related U.S. Application Data

(60) Provisional application No. 61/173,519, filed on Apr. 28, 2009, provisional application No. 61/173,510, filed on Apr. 28, 2009.

(51) Int. Cl.
*H04N 9/31* (2006.01)
*G03B 37/04* (2006.01)
*G03B 21/13* (2006.01)

(52) U.S. Cl.
CPC .............. *G03B 37/04* (2013.01); *H04N 9/3129* (2013.01); *H04N 9/3147* (2013.01); *H04N 9/3182* (2013.01); *G03B 21/13* (2013.01)

(58) Field of Classification Search
USPC .......... 345/426, 589, 590, 591, 603, 604, 1.1, 345/1.3, 4, 30, 40; 382/167, 274; 348/38–658, 674, 744–747, 750, 757, 348/758; 353/69, 70
See application file for complete search history.

(56) References Cited

U.S. PATENT DOCUMENTS 5,136,390 A * 8/1992 Inova et al. ................... 348/383
6,834,965 B2 * 12/2004 Raskar et al. ................... 353/94
6,877,859 B2 * 4/2005 Silverstein et al. ............. 353/20

(Continued)

OTHER PUBLICATIONS

Majumder and Stevens, Perceptual Photometric Seamlessness in Projection-Based Tiled Displays, Jan. 2005, ACM Transactions on Graphics, vol. 24 Issue 1, pp. 118-139.*

*Primary Examiner* — Xiao M. Wu
*Assistant Examiner* — Steven Elbinger
(74) *Attorney, Agent, or Firm* — Shimokaji IP

(57) ABSTRACT

A method includes generating in a computer a representation for the color transfer function both direct and inverse, of a nonideal source device to those in a target device significantly different than the source device, using higher-dimensional Bezier patches by using a non-linear parameterization of the Bezier patches in the XYZ space for converting the RGB colors in the source device. The method is illustrated in an application for processing spatial variation in luminance and chrominance in a multiple projector display, which include the steps of balancing per projector white point, morphing per pixel chrominance gamut, constraining per pixel perceptual luminance; and smoothing per pixel Bezier based luminance.

12 Claims, 7 Drawing Sheets

(56) References Cited

U.S. PATENT DOCUMENTS

| | | | |
|---|---|---|---|
| 7,502,125 B2* | 3/2009 | Suzuki | 356/604 |
| 2002/0015052 A1* | 2/2002 | Deering | 345/647 |
| 2002/0041708 A1* | 4/2002 | Pettitt | 382/167 |
| 2003/0133609 A1* | 7/2003 | Ubillos et al. | 382/167 |
| 2007/0076133 A1* | 4/2007 | Shimizu et al. | 349/5 |
| 2007/0103646 A1* | 5/2007 | Young | 353/52 |
| 2007/0171380 A1* | 7/2007 | Wright et al. | 353/69 |
| 2007/0291047 A1* | 12/2007 | Harville et al. | 345/589 |
| 2008/0062164 A1* | 3/2008 | Bassi et al. | 345/214 |

* cited by examiner

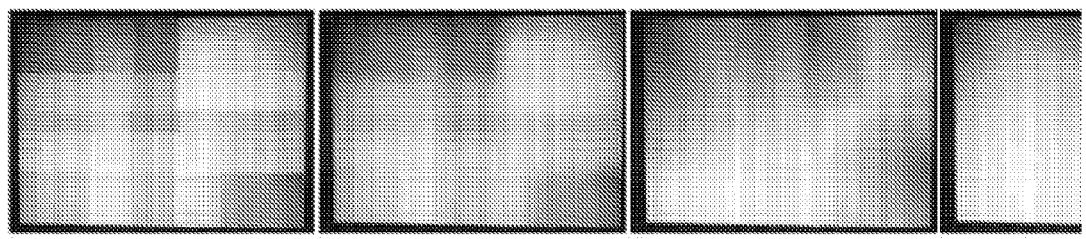
FIG. 5A   FIG. 5B   FIG. 5C   FIG. 5D
FIG. 6A   FIG. 6B
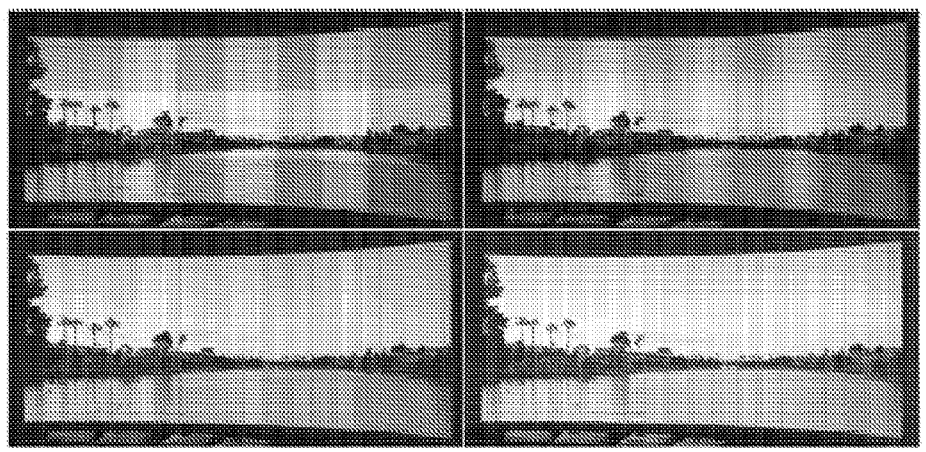
FIG. 6C   FIG. 6D

COLOR SEAMLESSNESS ACROSS TILED MULTI-PROJECTOR DISPLAYS

RELATED APPLICATIONS

The present application is related to U.S. Provisional Patent Applications, Ser. Nos. 61/173,510 and 61/173,519 filed on Apr. 28, 2009, which are incorporated herein by reference and to which priority is claimed pursuant to 35 USC 119.

BACKGROUND OF THE INVENTION

Field of the Invention

Tiled multi-device displays show significant spatial variation in three dimensional color gamuts due to spatial variation in the chromaticity gamuts and brightness within and across the devices. In case of projection-based displays, this also includes the addition of brightness and chrominance in the overlap across adjacent devices. This manifests itself as severe spatial color non-uniformity across the display. In this disclosure, we present a new constrained gamut morphing method that removes these spatial variations in brightness (or luminance) and chrominance resulting in a true color seamlessness across tiled multi-device displays.

Our color morphing algorithm adjusts the intensities of light from each pixel of each devise precisely to achieve a smooth morphing from one pixel's gamut to the another's through the overlap region. This morphing is achieved by imposing precise constraints on the perceptual difference between the gamuts of two adjacent pixels. In addition, our gamut morphing assures higher derivative continuity yielding visually pleasing appearance across the entire display.

The gamut morphing is achieved by a smooth morphing of the chrominance gamut followed by a smoothing of the luminance. The chrominance morph is achieved by changing the luminance at every pixel in a carefully controlled manner.

Our method needs an apparatus that can capture a number of images from each device. These images are used as input to generate some attenuation masks (or alpha masks) and some look-up-tables for each device. These are then used to correct the images automatically to create a seamless display.

Our method can be applied on any developable surfaces.

Our method achieves a common white point across the entire display.

Our method can be applied to both low and high-end projectors.

Our method is completely automatic.

It can be applied in software, or in real time via an embedded hardware in the device or via special purpose hardware in the machines driving the devices.

Our method is scalable to large number of devices.

This is the first example of a scalable method with strong foundations on perception and realizes, for the first time, a truly seamless display where the number of devices cannot be deciphered.

Our method smoothes based on strong perceptual foundations such that the variation is not visible to the human eye. Hence, uniform color gamut at every pixel is not required. Further, our gamut morphing assures maximal area of the chrominance gamut, brightness and dynamic range while achieving imperceptible brightness (or luminance) and chrominance spatial variations.

The advantages of the illustrated embodiment over the prior art are as follows. All prior art correct for spatial brightness (or luminance) variation across a multi-device display. Those which address chrominance variation only match color gamut across devices and do not address spatial chrominance variation. All prior art that address chrominance variation match the chrominance across devices resulting in a compression in chrominance gamut and dynamic range. This results in dim display of low contrast with poor color range. On contrary, we smooth the chrominance and luminance variation across the entire display in a manner that minimizes compression of contrast (or dynamic range), brightness (or luminance) and chrominance gamut. Hence, the quality of seamlessness achieved by our method where individual devices are not detected is not possible with similar kind of variation by any prior art. Finally, unlike all prior art, our method assures higher order derivative continuity in the color variation of multi-device displays.

Our method can be used in any multi-device displays—like virtual reality centers, CAVES, planar display walls, training and simulation centers.

The prior art include U.S. Pat. No. 7,038,727.

Existing methods address only parts of these problems and hence cannot provide a general and comprehensive solution. The prior art of gamut matching ignores intra-projector luminance and chrominance variation and proposes a gamut matching method to achieve color balancing across the different projectors but the complexity of the method makes it unscalable to many devices. Further, gamut matching considerably restricts the final achievable gamut reducing the color quality and resolution of the display. The prior art ignores both inter- and intra projector chrominance variations and matches the luminance transfer functions (commonly called gamma functions) to achieve a luminance balancing across different projectors. Blending or feathering techniques ignore both intra and inter projector chrominance and luminance variations and address only the overlap variation either in software or using specialized hardware mounted on the light path from the projector. Since these methods do not address the spatial variation in the color in a comprehensive manner, they result in softening of seams rather than achieving a seamless result. Only one prior art addresses the spatial variation of luminance to achieve a perceptually smooth variation across the display. However, since the spatial variation in chrominance is not addressed, color blotches are still visible, especially for flat colors when humans are more sensitive to artifacts. Hence, currently multi-device displays—especially multi-projector displays where spatial color variation is server—use very expensive devices avoiding commodity devices. Or, expensive optical elements like precision filters and Fresnel lenses are used to address the problem optically. Our color morphing method addresses the spatial variation in both brightness (or luminance) and chrominance in a general and unified manner and allows building truly seamless displays even with low-quality devices (e.g. commodity, aging; mobile).

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visual-

BRIEF DESCRIPTION OF THE DRAWINGS

FIGS. 5a-5d are a series of comparisons of our method with existing work on the most difficult case of white on the planar display. Note that white is the most difficult test case showing both chrominance and brightness variation. FIG. 5a shows the display before any correction, FIG. 5b shows the display after simple RGB blending, FIG. 5c shows the display after applying a photometric seamlessness algorithm with I=400, and FIG. 5d shows the display after our gamut morphing algorithm where the perceptual brightness constraint uses A=250.

FIGS. 6a-6d are comparisons of our method with existing work on the most difficult case of white on a curved display made of a 2×4 array of eight displays. FIG. 6a shows the display before any correction, FIG. 6b shows the display after simple RGB blending, FIG. 6c shows the display after applying a photometric seamlessness algorithm with A=400, and FIG. 6d shows the display after our gamut morphing algorithm where the perceptual brightness constraint uses A=250.

FIG. 8a shows the display before correction, FIG. 8b after white point balancing, FIG. 8c after chrominance gamut morphing in the horizontal direction, FIG. 8d after chrominance gamut morphing in the vertical direction, FIG. 8e after perceptual luminance constraining, and FIG. 8f the final result after Bezier based smoothing.

Figures 1A, 1B:
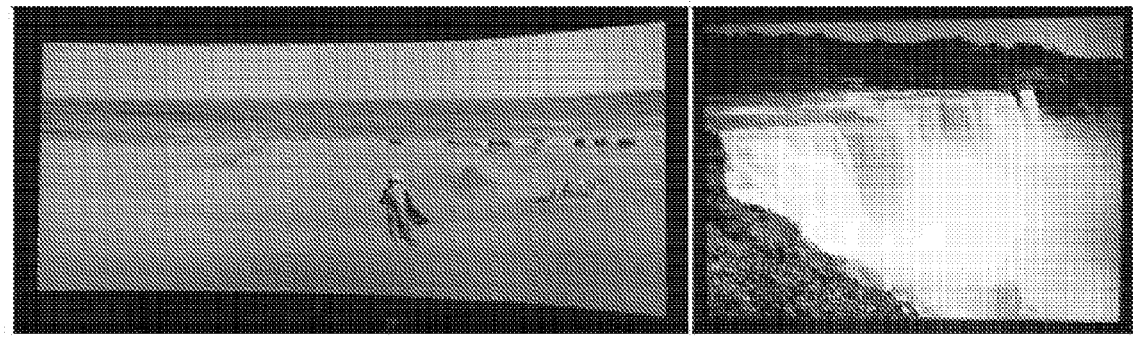
FIGS. 1a and 1b show the results of the color gamut morphing method in two multi-device displays on a curved screen in FIG. 1a and a planar screen in FIG. 1b. The number of devices (projectors in this case) making up the display cannot be discerned from the results.

The invention and its various embodiments can now be better understood by turning to the following detailed description of the illustrated embodiments which are presented as illustrated examples of the invention defined in the claims. It is expressly understood that the invention as defined by the claims may be broader than the illustrated embodiments described below.

DETAILED DESCRIPTION OF THE ILLUSTRATED EMBODIMENTS

We use CIE XYZ space for all our color computations. A color in the CIE XYZ color space is defined by its three dimensional coordinates (X,Y,Z), more commonly called the tristimulus values. Y is the luminance of a color and the chrominance of a color is given by its chromaticity coordinates, (x,y), defined as $$(x, y) = \left(\frac{X}{X+Y+Z}, \frac{Y}{X+Y+Z}\right). \quad (1)$$

In other words, $$(X,Y,Z)=(xB,yB)(1-x-y)B) \quad (2)$$

where B=X+Y+Z which we call the tristimulus brightness. The range of (x, y) visible to the human eye is the chromaticity chart.

Consider the scaling of color. All colors lying on the vector (X, Y, Z) can be represented as k(X, Y, Z) where k is a scale factor. From Equation 1, it can be seen that the chrominance of all these colors are the same, but the B and Y are scaled to, kB and kY respectively. Conversely, for any two colors with the same chrominance, the ratio of their Y and the ratio of their B are the same.

Turn to the addition of colors. The addition of two colors, $(X_1, Y_1, Z_1)$ and $(X_2, Y_2, Z_2)$ to create a new color $(X_3, Y_3, Z_3)$ is given by the vector addition of these two colors in the CIE XYZ space, i.e., $$(X_3,Y_3,Z_3)=(X_1+X_2,Y_1+Y_2,Z_1+Z_2) \quad (3)$$

Clearly, the Y and B of the new colors are given by $$Y_3=Y_1+Y_2, B_3=B_1+B_2; \quad (4)$$

Further, using equations 1 and 3, the chrominance of the new color is given by $$(x_3, y_3) = \left(\frac{x_1 B_1 + x_2 B_2}{B_1 + B_2}, \frac{y_1 B_1 + y_2 B_2}{B_1 + B_2}\right) \quad (6)$$

Note that $B_1/(B_1+B_2)$ and $B_2/(B_1+B_2)$ are the barycentric coordinates of the new chrominance $(x_3, y_3)$ with respect to $(x_1, y_1)$ and $(x_2, y_2)$. This result can be generalized to n colors, where the chrominance of the new color lies within the convex hull of the chrominance of the constituting n colors.

Consider now the algorithm employed in the illustrated embodiments. A multi-projector display is a display made of M projectors, each denoted by $P_j$, $1 \leq j \leq M$. We denote the coordinates of projector with (p, q) and the display coordinates by (s, t). We assume that the relationship between the projector and the display coordinates has been discovered a priori using a conventional geometric registration method. Hence, the display coordinate (s, t) is related to the coordinates $(p_j, q_j)$ of projector $P_j$ by $(s, t)=G_j(p_j, q_j)$. $G_j$ can be deciphered using any conventional geometric calibration technique.

In a display, let the color formed by a channel input $i_l=1$ be $(X_l, Y_l, Z_l)$ and hence $B_l=X_l+Y_l+Z_l$. Assuming linear displays, as $i_l$ changes from 0 to 1, the colors are given by $i_l(X_l, Y_l, Z_l)$. Hence, from above, their chrominance remains constant and $B_l$ is scaled. The three channels of the display forms three vectors in the XYZ space. Hence, all the colors reproduced by the display is given by the parallelepiped spanned by the three vectors $(X_l, Y_l, Z_l)$, $l \in \{r, g, b\}$. This is called the three dimensional color gamut of the display. Alternatively, this gamut can also be defined by a two dimensional chrominance gamut, the tristimulus brightness and the chrominance of white produced by $i_r = i_g = i_b = 1$. The two dimensional chrominance gamut is given by the triangle T given by $(x_l, y_l)$, $l \in \{r, g, b\}$. The tristimulus brightness of white, $B_W$, is given by $$B_W = \Sigma_l X_l + Y_l + Z_l = \Sigma_l B_l.$$

And the chrominance of the white, $(x_W, y_W)$ is given by $$(x_W, y_W) = \sum_l \frac{B_l}{B_W}(x_l, y_l). \quad (6)$$

Consider first a single projector display. Empirical data shows that the color within a projector shows spatial dependency due to the vignetting effect. The vignetting effect is a spatial fall off of brightness from around the center to the fringes of the projector. However, this is a channel independent effect and hence affects the $B_l$ of all the different channels in the same manner. Hence, $B_l$ at any pixel (p, q) is given by $$B_l(p,q) = V(p,q)B_l. \quad (9)$$

Thus, the spatially varying tristimulus brightness of white is given by $$B_W(p, q) = \sum_l V(p, q)B_l. \quad (8)$$

However, since the vignetting is a channel independent scale factor, it does not affect the two dimensional chrominance gamut T which is still spatially constant.

Consider a multi-projector display. Let us now consider the overlap of N projectors and a pixel (s, t) in the overlap region. Thus, the $B_l$ for each channel in the overlap region is given by $$B_l(s, t) = \sum_{j \in N} V_j(p_j, q_j) B_{l_j}. \quad (9)$$

This indicates a spatial variation in $B_W$ given by $$B_W(s, t) = \sum_l \left( \sum_{j \in N} V_j(p_j, q_j) B_{l_j} \right). \quad (10)$$

However, the chrominance of each channel will now depend on the proportions of the resulting $B_l$ from different channels. Since the vignetting is different for different projectors, $B_l$ will change in a channel dependent manner in the overlap region thus creating spatially varying chrominance gamut T(s, t). T(s, t) is defined by the three primaries ($x_l$(s, t), $y_l$(s, t)) as $$(x_l(s, t), y_l(s, t)) = \sum_j \frac{B_l(s, t)}{B_W(s, t)}(x_{l_j}, y_{l_j}) \quad (11)$$

Note that the variation in the T(s, t) stems out of the variation in the $B_l$ and $B_W$ rather than the $(x_l, y_l)$ which are constant for each projector $P_j$. From Equations 9 and 10, we see that this variation in turn depends on the relative shape of vignetting effect $V_j(p_j, q_j)$ and the brightness of the comprising projectors $B_l$, both of which can show a large variation in any tiled display leading marked variation and discontinuities of the chrominance in the overlap region. Similarly, $B_W(s, t)$ also shows visible discontinuities.

Our goal is to remove such discontinuities to create a perceptually uniform appearance. The key to this lies in controlling the $V_j$ and $B_l$ from each projector, by scaling their contributions at each pixel precisely, to realize a smooth change in both $B_W(s, t)$ and T(s, t). Further, we want to constrain this per-pixel scaling based on strong foundations of limitations of human perception, so that they are not distracting to the human eye. This will result in a smooth morphing of the three dimensional gamut from one pixel to another ensuring perceptual seamlessness. We present a new algorithm to achieve such a per-pixel scaling that assures a smooth three dimensional gamut morphing.

Our algorithm has four different steps: (a) Per Projector White Point Balancing, (b) Per Pixel Chrominance Gamut Morphing, (b) Per Pixel Perceptual Luminance Constraining, and (c) Per Pixel Bezier Based Luminance Smoothing.

Turn to the first step of per projector white point balancing. It is a well known fact that the human eye is very sensitive to the white point of displays. So, the first step in our method is a white point balancing for each projector. Let $(x_D, y_D)$ be the desired white point. Using equation 6, we find for each projector a per-channel scale factor $\alpha_l$, $0 \leq \alpha_l \leq 1$ such that $$\frac{\sum_l \alpha_l B_l (x_l, y_l)}{\sum_l \alpha_l B_l} = (x_D, y_D), \quad (12)$$

where $(x_D, y_D)$ is the desired white point. We first fix $\alpha_r = 1$ and then solve the two linear equations resulting from the above equations to find $\alpha_g$ and $\alpha_b$. If this leads to an $\alpha$ which is not within 0 and 1, then we repeat the process with either $\alpha_g = 1$ or $\alpha_b = 1$. Note that since the vignetting effect scales $B_l$ and B similarly at any pixel, the above equation will yield the same $\alpha_l$ irrespective of the pixel at which it is computed.

Figure 2:
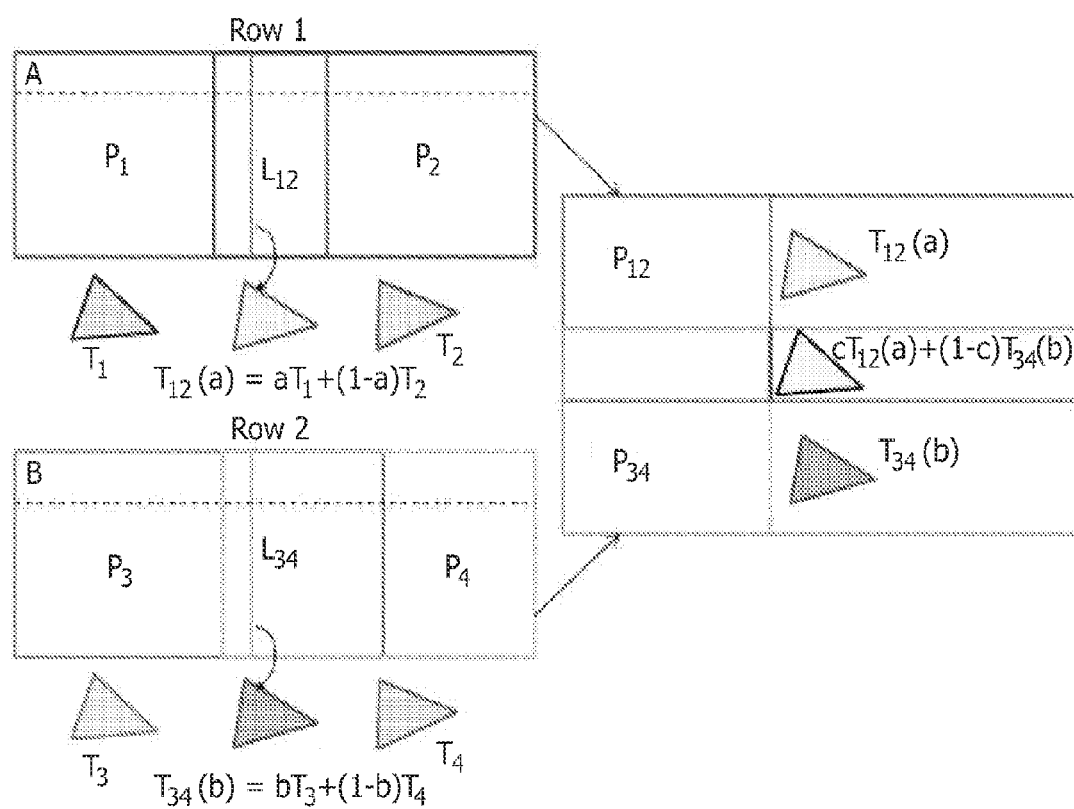
FIG. 2 is a diagram of the morphing of the chrominance gamut in the horizontal and vertical direction in a display made of rectangular overlapped devices.

The next step is per pixel chrominance gamut morphing. In this step we morph the two-dimensional chrominance gamut of one projector to that of the other across the overlap region. However, the morph we design is constrained to retain the white point that was achieved in our earlier step. Further, this morph assumes rectangular projections and horizontal/vertical overlaps. An algorithm to assure this in any general tiled display is described as follows. We describe now an algorithm to achieve rectangular projections and overlaps for our chrominance gamut morphing method. For illustration of the process, refer to FIG. 2. Let us consider a single row of two rectangular projectors $P_1$ and $P_2$. Their two dimensional chrominance gamut in the nonoverlapping regions are denoted by the $T_1$ and $T_2$ respectively. Now, consider a horizontal scanline A through these two projectors. At any point in the overlap region in this scanline, we want to morph the chrominance gamut in the horizontal direction. This is achieved by linear morphing of $T_1$ to $T_2$ controlled by the parameter a. Details of this morphing algorithm is provided below. Since the overlap between the projectors is rectangular, any vertical line $L_{12}$ will have the identical morphed gamut, $T_{12}(a)$. Following the horizontal morph, we can consider $P_1$ and $P_2$ together to form a large projector $P_{12}$ where every vertical line has identical chrominance gamut. Similarly, horizontal chrominance gamut morphing can be applied independently to another row of projectors $P_3$ and $P_4$ to form a large projector $P_{34}$ where the same property holds. Now, in a display made of two rows of projectors $P_{12}$ and $P_{34}$ with a overlap between them every vertical line follows the property that it has constant chrominance gamut in the region with no overlap. Hence, they can be morphed in the vertical direction linearly exactly the same way as the horizontal morph. This method can extend to n projectors in each row and m rows in the display. Thus, by performing two passes of chrominance gamut morphs in each of the horizontal and vertical direction, we can produce a smoothly morphed chrominance gamut at any point on the display.

Figures 10A, 10B, 10C:
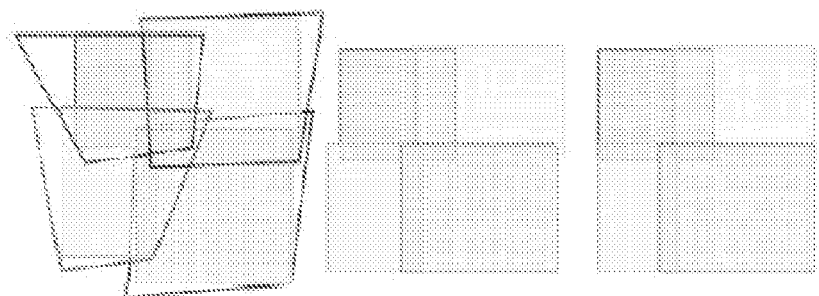
FIGS. 10a-10c is a diagram of the method to find rectangular projections and overlaps from a set of overlapping keystoned projectors.

However, note that the key aspect of the above method is that the projectors have to be rectangular with rectangular overlap regions. This is hardly the case, especially since projectors have off-axis projection leading to keystoning effect. Hence, we first turn off some pixel at the boundaries to make each projection rectangular. FIGS. 10a-10c illustrates this process. First, we find the largest inscribed rectangle for each projector using conventional methods, as shown in FIG. 10a. Next, we consider every row of projectors independently as a single projector and repeat the process of the finding the largest inscribed rectangle in them. All pixels outside this rectangle are again turned off. Multiple such rows of projectors are arranged in a column and the above process is repeated again. The above process ensures a rectangular projection, display, and horizontal/vertical overlaps. Note that the keystoning showed for each projector is exaggerated for illustration purpose in FIG. 10a. In reality, the keystoning is much smaller and this does not lead to much pixel wastage. We measured these wasted pixels for both our set up. On the planar display, where it is easy to achieve a close to rectangular grid, the wastage was about 9.6%. On the curved display, where the keystoning is more severe, we see a wastage of 19.8%.

Following is the description of our chrominance gamut morphing method. A chrominance gamut T is denoted by a triangle whose vertices are given by R, G and B. Let us now consider two chrominance gamuts $T_1$ and $T_2$. We desire to define a morph that takes $R_1$ to $R_2$, $G_1$ to $G_2$ and $B_1$ to $B_2$. For an intermediate chrominance gamut $t_k$, we would like the chrominance of the primaries $r_k$, $g_k$ and $b_k$ to be a constrained linear combination of the chrominance of the primaries of $T_1$ and $T_2$. Hence, $$r_k = (1-\tau)R_1 + \tau R_2$$

$$g_k = (1-\tau)G_1 + \tau G_2$$

$$bk = (1-\tau)B_1 + \tau B_2 \quad (13)-(15)$$

Note that from Equation 5, $1-\tau$ is given by the proportions of the $B_I$ of the channel. Hence, we need to find scale factors $\beta_{I_1}$ and $\beta_{I_2}$ between 0 and 1 such that $$\frac{\beta_{l_1} B_{l_1}}{\beta_{l_1} B_{l_1} + \beta_{l_2} B_{l_2}} = 1 - \tau \quad (16)-(17)$$

$$\frac{\beta_{l_2} B_{l_2}}{\beta_{l_1} B_{l_1} + \beta_{l_2} B_{l_2}} = \tau$$

Clearly, computing $\beta_{l_1}$ and $\beta_{l_2}$ from the above proportions is an under constrained system. So, we first fix $\beta_{l_1}$ and compute the $\beta_{l_2}$. If this exceeds 1, we reverse the computation by setting $\beta_{l_2}=1$. However, note that this process results in per channel scale factor at every pixel which would ruin the white point balancing achieved in the previous step. So, we make a conscious choice here to retain the white point by computing one common factor for all channels. Hence we seek $\beta_{l_1}$ and $\beta_{l_2}$ such that $$\frac{\beta_1 B_{W_1}}{\beta_1 B_{W_1} + \beta_2 B_{W_2}} = 1 - \tau \quad (18)-(19)$$

$$\frac{\beta_2 B_{W_2}}{\beta_1 B_{W_2} 1 + \beta_2 B_{W_2}} = \tau$$

Note that this means that the intermediate chrominance gamut $t_k$ is still a linear combination of $T_1$ and $T_2$.

The next question is how many such $t_k$'s are required so that the transition between $T_1$ and $T_2$ is imperceptible. Let us assume that we make the transition from $T_1$ to $T_2$ through n steps $T_1 \rightarrow t_1 \rightarrow t_2 \ldots t_n \rightarrow T_2$ such that each of the transitions $t_k \rightarrow t_{k+1}$ is imperceptible. To assure this, we first find the smallest imperceptible distance d in the chromaticity chart. Then, we choose n as $$n = \frac{\max(|R_1 R_2|, |G_1 G_2|, |B_1 B_2|)}{\delta} \quad (20)$$

Figure 3:
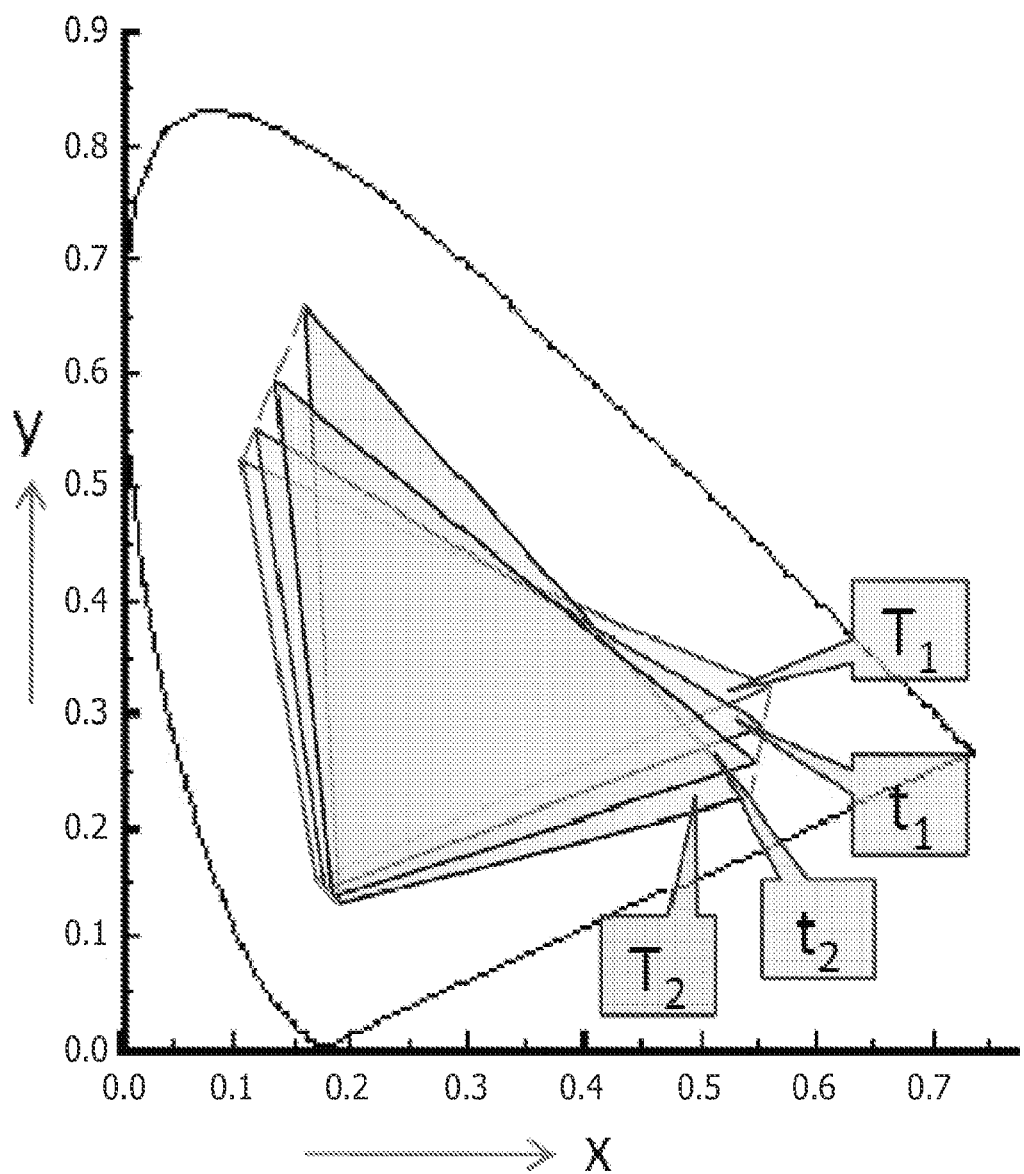
FIG. 3 is a graph of the chrominance gamut morphs with two intermediate steps (across two overlapping pixels).

We discuss the value of $\delta$ below. This chrominance gamut morphing is illustrated in FIG. 3.

Figure 4:
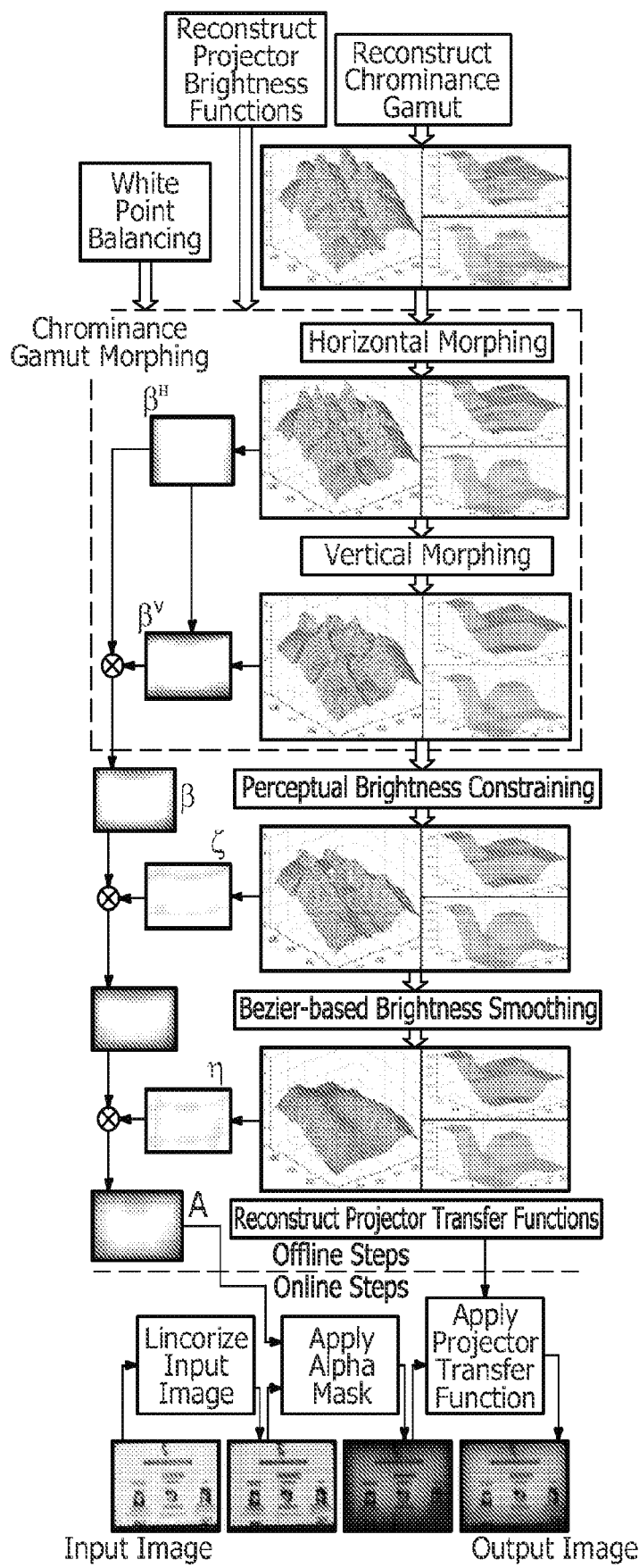
FIG. 4 is a flowchart of the illustrated algorithm. We show the spatial variation in brightness (blue), the x (red) and y (green) of the red primary of the entire display after every step of our algorithm. Note how all of these are smoothened during the course of our method. On the left, we show the attenuation map for a single projector after every step.
Figures 7A, 7B, 7C, 7D, 7E:
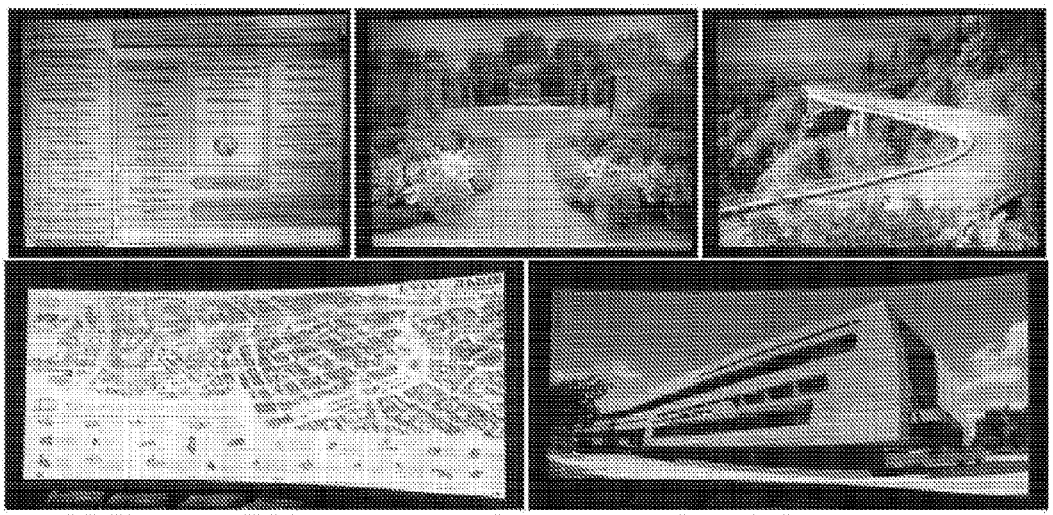
FIGS. 7a-7e are a variety of images corrected using our method on our 9 device planar in FIGS. 7a-7c and eight device curved display in FIGS. 7d and 7e. Note that the number of devices are not visible in any display.
Figures 8A, 8B, 8C, 8D, 8E, 8F:
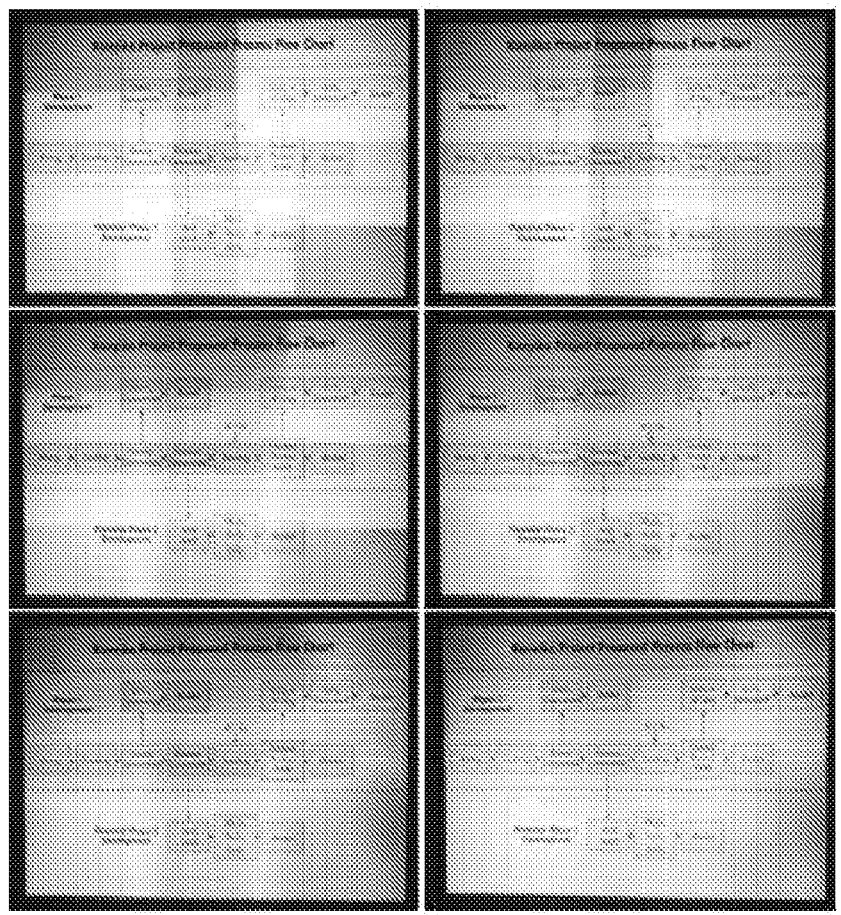
FIGS. 8a-8f show the results from the different steps of our method illustrated on the planar display of 9 devices.

Thus, following the horizontal and vertical morphs as described above, a scale factor for each projector is generated for each pixel in the overlap region. These two are multiplied to create one spatially dependent map of per pixel attenuation factors per projector that defines how the inputs of the projector at every pixel of the overlapping region should be scaled to achieve a smooth morphing of the chrominance gamut. These maps after each of the horizontal and vertical chrominance gamut morph is shown in FIG. 4.

It is important to note that n decides the number of pixels required to achieve an imperceptible morph. If this n is greater than the size of the overlap region in pixels, we may not be able to achieve an imperceptible morph. This demands a minimum size of the overlap to achieve chrominance gamut morphing and is discussed below. However, if n is less than the size of the overlap region, then we morph in the first and last n/2 pixels in the overlap. For the remaining pixels in the center of the overlap, we compute and maintain the chrominance gamut $$t_{k_{\frac{n}{2}}} = 0.5(T_1 + T_2).$$

This assures that the brightness of the overlap region following the chrominance gamut morph is maximized. Note that, since the scale factors $\beta_1$ and $\beta_2$ are chosen to be same across all channels as opposed to different for different channels, the transition from $t_k$ to $t_{k+1}$ will not assure equal changes in the chromaticity coordinates of the primaries, rather a monotonically increasing or decreasing change in the chromaticity coordinates of the primaries. The effect of this in the choice of $\delta$ is discussed below.

Thus, the chrominance gamut morphing step generates for each projector $P_j$ two attenuation maps, $\beta^H_j (p_j, q_j)$ and $\beta^V_j$ $(p_j, q_j)$, following horizontal and vertical morphs respectively. These two are multiplied to generate the final map $$\beta_j=(p_j,q_j)=\beta_j^H(p_j,q_j)\times\beta_j^V(p_j,q_j)$$

as shown in FIG. 4. Following the application of the above attenuation maps, the new Bw, denoted by $B_{W_C}(s, t)$, at every pixel (s, t) on the display becomes $$B_{W_C}(s, t) = \sum_{j\in N}\left(\sum_l \beta_j(p_j, q_j)B_{l_j}V_j(p_j, q_j)\right) \quad (21)$$

where N is the set of projectors that overlap at pixel (s, t) (FIG. 4).

Turn to the step of per pixel perceptual brightness constraining. Our chrominance gamut morphing step assured that the chrominance changes smoothly across the entire display. But no constraints have yet been put on the brightness variation of the display. Thus, the display still shows sharp brightness changes resulting in seams. In this step, we apply perceptual constraining on $Bw_c$ (s,t). By this, a perception based gradient constraint is applied to $Bw_c$ (s,t) resulting in $Bw_E$ (s,t) as shown in FIG. 4. To achieve this $Bw_E$ (s,t), the contributions from all channels at that pixel should be multiplied by $$\zeta(s, t) = \frac{B_{W_E}(s, t)}{B_{W_C}(s, t)} \quad (22)$$

This attenuation map $\zeta(s, t)$ in the display coordinates is then broken into attenuation maps for each projector $\zeta_j(p_j,q_j)$. Note that in this case, $N_p$ projectors overlapping in a pixel (s, t) all get the same $\zeta(s, t)$. Hence, this step retains the chrominance achieved by the chrominance gamut morphing step and changes only the brightness. Both the attenuation map and the brightness constraining are illustrated in FIG. 4.

Turn now to the step of per pixel Bezier based brightness smoothing. The luminance obtained after the perceptual luminance constraining still has $C^1$ discontinuity. This step is designed to seek a brightness $B_{w_s}$ which is closest to $B_{W_E}$ but assures $C^1$ continuity. For this, we fit a higher order $C^1$ continuous two dimensional Bezier surface to $B_{W_E}$. However, to assure $C^1$ continuity in the perceptual domain, we apply this operation in log scale. We call the function thus generated $B_{W_S}(s, t)$. To achieve the $B_{W_S}(s, t)$, the contributions from all channels at the pixel should be multiplied by $$\eta(s, t) = \frac{B_{W_S}(s, t)}{B_{W_E}(s, t)} \quad (23)$$

$\eta(s, t)$ is then again broken into attenuation maps for each projector $\eta_j(p_j,q_j)$. Note that since this is a surface fitting step, $\eta(s, t)$ can be slightly greater than 1.0 at places. So, we normalize $\eta(s, t)$ to assure no saturation artifacts. In this case also, the N projectors overlapping in a pixel (s, t) all get the same $\eta(s, t)$. Hence, this step also retains the chrominance achieved by the chrominance gamut morphing step and changes only the brightness. Both the attenuation map and the result of the Bezier fitting is illustrated in FIG. 4.

Turn now to the step of image correction. Let l(p,q) be the image generated in the projector coordinates after applying the geometric function G. First, we linearize the image I(p, q) using a gamma function. We multiply the different attenuation maps to create a final attenuation map $A_j(p, q)=\beta_j(p, q)\times\zeta_j(p, q)\times\eta_j(p, q)$. To achieve the color correction, we pixel-wise multiply I with the attenuation map $A_j$ to generate an appropriately scaled I, $I_S(p, q)$, such that $$I_S(p,q)=l(p,q)\times A_j(p,q)$$

Note that $A_j$ is channel independent and hence multiplies all the channels of $I_j$ similarly. Following this, we apply the channel dependent white point correction to generate the white point corrected image $I_W$ as $$I_{W_l}(p,q)=\alpha_l I_{S_l}(p,q)$$

where $I\in\{r, g, b\}$. Now note, all the above corrections described till now assumes a linear projector. However, in practice the projectors have a channel input transfer function, denoted by $h_l$. So, to achieve the desired changes in this non-linear device, the final correction is achieved by applying the inverse of $h_l$ to $I_W$. Hence, the final corrected image $I_C$ is given by $$I_{C_l}(p,q)=h_l^{-1}(I_{W_l}(p,q)),$$

where $I\in\{r, g, b\}$.

We have implemented our method using MATLAB on two displays: (a) a planar rear projected display of 3×3 array of nine very low end projectors, (b) a cylindrical front projected display of 2×4 array of eight relatively higher-end projectors. Since (a) is rear-projection system with a screen that deviates considerably from Lambertian and uses old (about 3-4 years) low-end projectors, this shows severe color variation and is an excellent test case for our algorithm. Although (b) uses a diffuse front projection screen with relatively new (1 year) projectors, they also show considerable color variation.

To reconstruct the spatially varying color gamut for the projectors, we use an sRGB camera as a sensor. Ideally, a spectroradiometer should be used to measure the chrominance. But since most projectors have a chrominance gamut within the sRGB gamut, using a camera yields sufficient accuracy in measurement. To measure the chromaticity gamut of each projector, we put up for each projector the maximum intensity red, green and blue values. We used a small region near the center of each projector where sRGB measurements are averaged, converted to XYZ using standard sRGB to XYZ conversions and then the chromaticity coordinates are computed. The vignetting effect is measured by projecting white from each projector and then capturing it using the high resolution camera—this step does not need a spectroradiometer. Brightness capture which is required at a high resolution is done by a camera and the chrominance capture which can be done at one point per projector can be done for each projector using a camera/spectroradiometer depending on the nature of the projector. The geometric relationship between the camera, projector and the display are recovered using conventional methods. The camera RGB values at corresponding locations for the projector are then converted to XYZ and then to tristimulus brightness to recover the vignetting effect $V_j$. To recover $h_l$ we use the technique where we project a uniform sampling of inputs for each channel l and find their corresponding tristimulus brightness from the captured RGB value at the center of the projector.

Consider real-time image correction on GPU. The computation of the attenuation maps is done offline and takes about five minutes. This generates three alpha masks (one for each channel) and three inverse transfer functions (one for each channel) for each projector, which are then used for image correction. We have implemented the real-time image correction algorithm on modern GPUs through Chromium an open-source distributed rendering engine for PC clusters. A module for Chromium is written that first multiplies the image with the alpha masks and then uses an one dimensional look-up-table to apply the inverse transfer functions. These are done using a fragment shader on the GPUs at interactive rates.

Consider now the results on both the planar and the curved screen. Note that the acid test for any color correction method is white and flat colors. Results on such images are not shown in almost any prior work. FIGS. 5a-5d compare our method with traditional RGB blending and a method of photometric seamlessness on white on our worst display (planar one) made of old low-end projectors on a rear-projection screen. We also compare our results on the much better projectors on the curved screen in FIGS. 6a-6d. In both cases, our results show a much superior seamlessness. FIGS. 7a-7e show the results of our algorithm on many different images both on the planar and the curved screen display. FIGS. 8a-8f show the different steps of our process and how they progressively improve the quality of seamlessness resulting in the final one where there the projectors cannot be detected.

Turn now to the issue of minimum size of the overlap and $\delta$. Consider the overlap of two projectors $P_1$ and $P_2$. For projector $P_1$, following the chrominance gamut morph, t defines the contribution of $P_1$ to a pixel in the overlapping region. Hence, $B_{w1}/(B_{w1}+B_{w2})\tau$. Now, let us consider the implication of this on the change in the proportion of the $B_l$ for a single channel from $P_1$ and $P_2$. Let us consider channel l, and let $B_{l_1}=k_1B_1$ and $B_{l_2}=k_2B_2$. Hence, the proportion of the brightness of one channel l for $P_1$ is given by $$\frac{k_1 B_{w_1}}{k_1 B_{w_1} + k_2 B_{w_2}} = \frac{k_1 \tau}{k_1 \tau + k_2 - k_2 \tau}$$

after replacing $$B_{w_2} = \frac{1-\tau}{\tau} B_{w_1}.$$

Taking the derivative of this we find that the speed of this will vary between $k_1/k_2$ and $k_2/k_1$. Note that usually $k_1$ and $k_2$ vary from projector to projector but not much since these signify the proportion of a primary in white. Hence, both these functions are close to 1. Thus, the chrominance of each primary will not see a linear change but a monotonically increasing/decreasing change that is close to linear. This is also evident from the chromaticity plots in FIG. 4.

During the chrominance gamut morph, ideally, we want $\delta$ to be less than 3 or 4 in the CIE LAB space in order for the color morph to be imperceptible. We ran the following analysis to find how much overlap we need to assure such a $\delta$. Consider the channel l on a pair of projectors, $P_1$ and $P_2$. Knowing the distance between the primary l on these two projectors, we plotted the maximum LAB distance between adjacent pixels in the overlap of $P_1$ and $P_2$ for varying size of the overlap region. We found this curve for all pairs of projectors (in our pool of 17 projectors) and then found the maximum of the LAB distance for each overlap size. The resulting plot (FIGS. 19a-19b) provides us with a good estimate of the maximum LAB distance that would result between adjacent pixels with varying overlap size. We know that a LAB distance of 3 or less is within the just noticeable distance (JND). In the plot we see that to be within the JND, we need a minimum of 90 pixels overlap for the green primary. As expected, the overlap region required for red and blue to assure the same is much smaller. This is due to the fact that the relatively higher luminance of green makes it easier to perceive chrominance variations. A overlap region of about 90 pixels is around 10% of the projector resolution in any direction. It is often required to overlap projectors much more to alleviate the falloff due to vignetting effect. Hence, the overlap region required by our method is reasonable in almost all tiled displays.

Our chrominance morphing achieves a superior result than traditional RGB blending. The primary reason for that is the space in which the blending is carried on. Traditional blending occurs in RGB space. But since the chromaticity coordinates (x, y) and the RGB space are not related linearly, but by a complex non-linear relationship, a linear change in the RGB space does not assure a linear change in the (x, y) space. This becomes especially pronounced when the projectors do not have similar brightness. Hence, the change in (x, y) varies non-linearly where it is not constrained to be within a tolerance. Our method morphs directly in the (x, y) space constraining it to be as close to linear as possible. Hence, we constrain the change in chrominance easily to be within the human tolerance (FIGS. 19a-19b). An additional advantage of our chrominance gamut morph is that, we may not use the entire overlap region for morphing and hence retain more of the brightness of the display.

Consider the effect on the display brightness. It is evident that every step of any color calibration method, including ours, imposes some constraints on the spatial color variation that would invariably lead to some reduction in the brightness of the display. Table 2 evaluates this reduction through the different stages of our method and with other existing method.

TABLE 2

Percentage reduction in dynamic range from before correction.

| Methods | Mean |
| --- | --- |
| After Chrominance Gamut Morphing | 13.49% |
| After Perceptual Brightness Constraint | 19.33% |
| After Bezier Based Smoothing (Our Method) | 25.86% |

Figures 9A, 9B:
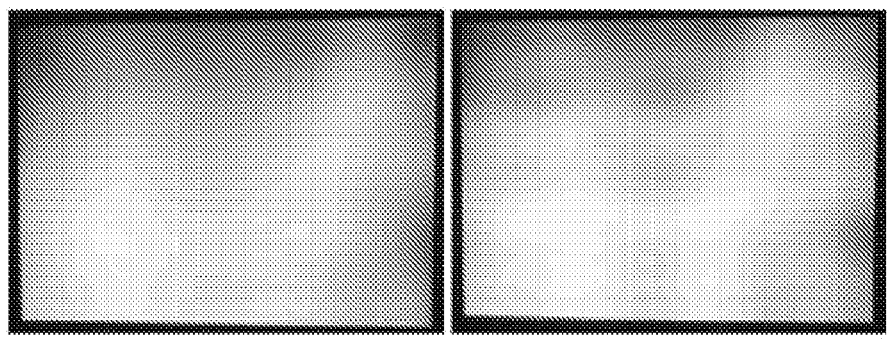
FIGS. 9a and 9b show the comparison of our method with in FIG. 9a and without in FIG. 9b applying the perceptual brightness constraining. Note that not applying perceptual brightness constraining cannot yield the desired smoothness.

As a metric, we use the mean of brightness of the white at all pixels of the display. Note that FIGS. 9a and 9b. The comparison of our method with FIG. 9a and without in FIG. 9b applying the perceptual brightness constraining. Note that not applying perceptual brightness constraining cannot yield the desired smoothness. Our method shows a reduction in dynamic range when compared to the photometric seamlessness method. This reduction is the price paid to achieve greater smoothness in both chrominance and brightness variation.

In our method, since the last step of Bezier based smoothing anyway smoothes the spatial brightness variation, one may question the utility of the perceptual brightness constraining. We emphasize this in FIGS. 9a and 9b, which shows the result with and without the use of this method. Note that the results are smoother and visually more pleasing when the perceptual brightness constraining is applied. Further, the Bezier based smoothing is just a way to fit a smooth function to the spatially varying brightness. If the underlying variation is perceptible to the human eye, the Bezier based smoothing seldom makes it imperceptible. Applying the perceptual brightness constraining step already assures that the spatial variation is within the human tolerance and hence the Bezier smoothing will provide a good fit to that.

In conclusion, we have presented the first method that addresses both the chrominance and luminance variation in a multi-projector display. Our method smoothes both the chrominance and the brightness across the entire display resulting in a true color seamlessness where the number of projectors are absolutely invisible in the display. This is achieved by a morphing of the two dimensional chrominance gamut in the overlap regions followed by brightness smoothing across the entire display, both guided by perceptual parameters to assure that the variation is within the human tolerance and is hence not detected. Unlike previous methods, our method is successful to achieve seamlessness even for the difficult cases of flat colors, especially flat white. Our work demonstrates, for the first time, that inexpensive multi-projector displays can indeed provide similar seamlessness as the cost-prohibitive high-resolution single projector displays. However, in this work, we assume that the chrominance gamut remains constant across a projector. But, in reality, the chrominance gamut does show some variation within a single projector. We expect to remove this constraining assumption in future work to improve results. There has been earlier work in achieving geometric registration in a distributed manner. We would like to explore our method to achieve color seamlessness in a distributed manner in large multiprojector displays.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of controlling an image display produced by multiple projectors, comprising:
   identifying a first image in the image display produced by a first projector;
   identifying a second image in the image display produced by a second projector;
   identifying a common region in the image display including a first region of pixels produced by the first projector and a second region of pixels produced by the second projector;
   morphing pixels in the common region from a first chrominance gamut, through a plurality of transitional chrominance gamuts, to a second chrominance gamut dependent on a number of projectors contributing pixels to the common region to produce a chrominance smoothed image display; and applying a brightness constraint to the chrominance smoothed image display to reduce intra-projector spatial color variations in the image display.

2. The method of claim 1, further comprising performing the morphing step in n>1 number of transitional steps.

3. The method of claim 1, wherein the morphing is performed changing a row of pixels in the first region with a corresponding row of pixels in the second region.

4. The method of claim 1, wherein the morphing is performed changing a horizontal row of pixels in the first region with a corresponding horizontal row of pixels in the second region.

5. The method of claim 4, wherein the morphing is also performed changing a vertical row of pixels in the first region with a corresponding vertical row of pixels in the second region.

6. The method of claim 1, wherein the first region of pixels and the second region of pixels are tiled along a common horizontal axis and along a common vertical axis within the common region.

7. The method of claim 1, further comprising:
   identifying a first white point in the first image;
   identifying a second white point in the second image; and
   identifying the common region to include the first and second white points.

8. The method of claim 1, further comprising turning off pixels in the first image and in the second image to produce rectangular areas in the first image and in the second image, wherein the common region of pixels includes pixels in the rectangular area of the first image and pixels of the rectangular area of the second image.

9. A method of controlling an image display produced by multiple projectors, comprising:
   identifying a first image in the image display produced by a first projector;

identifying a second image in the image display produced by a second projector;

identifying a common region of the image display of a first region of pixels produced by the first projector and a second region of pixels produced by the second projector; and applying a two dimensional Bezier surface fitting to a tri-stimulus brightness of white in log scale with a perception based gradient to pixels in the common region of the image display.

10. The method of claim 9, further comprising applying an attenuation map to the first region of pixels and to the second region of pixels in the common region.

11. The method of claim 9, further comprising applying chrominance gamut morphing to pixels in the common region of the image display.

12. The method of claim 9, further comprising identifying a white point in the first image and a white point in the second image.

* * * * *